United States Patent [19]
Fukazawa et al.

[11] Patent Number: 5,535,079
[45] Date of Patent: Jul. 9, 1996

[54] INTEGRATED THIN FILM MAGNETIC HEAD

[76] Inventors: Toshio Fukazawa, 151-30-3C-909, Mukaijima-Ninomaru-cho, Fushimi-ku, Kyoto City, 612; Yoshihiro Tosaki, 12-404, Sohjijidai, Ibaraki City, 567; Kumiko Wada, 2-2-22, Seiwadai-higashi, Kawanishi City, 666-01; Satoru Mitani, 1-13-15, Shohdai-nakamachi, Hirakata City, 573; Terumi Yanagi, 2-11-9-103, Noe, Joto-ku, Osaka City, 530, all of Japan

[21] Appl. No.: 332,048

[22] Filed: Nov. 1, 1994

Related U.S. Application Data

[63] Continuation of Ser. No. 888,357, May 27, 1992, abandoned.

[30] Foreign Application Priority Data

May 30, 1991 [JP] Japan .................................. 3-126316

[51] Int. Cl.⁶ .............................. G11B 5/29; G11B 5/127; G11B 5/147
[52] U.S. Cl. ........................... 360/126; 360/113; 360/121
[58] Field of Search ...................................... 360/121, 122, 360/113, 126, 125, 103; 324/207.21

[56] References Cited

U.S. PATENT DOCUMENTS

| | | |
|---|---|---|
| 3,908,194 | 9/1975 | Romankiw . |
| 4,489,357 | 12/1984 | Van Oijen ................................ 360/122 |
| 4,599,668 | 7/1986 | Griffith ................................... 360/126 |
| 4,789,910 | 12/1988 | Otsuka et al. ........................... 360/125 |
| 4,907,113 | 3/1990 | Mallary . |
| 5,095,397 | 3/1992 | Nagata et al. ........................... 360/122 |
| 5,155,644 | 10/1992 | Kira et al.et al. ....................... 360/113 |
| 5,164,869 | 11/1992 | Fontana, Jr. et al. ................... 360/126 |
| 5,168,409 | 12/1992 | Koyama et al. ......................... 360/122 |
| 5,200,056 | 4/1993 | Cohen et al. ............................ 360/110 |

FOREIGN PATENT DOCUMENTS

| | | |
|---|---|---|
| 301823 | 2/1989 | European Pat. Off. . |
| 423878 | 4/1991 | European Pat. Off. . |
| 514976 | 11/1992 | European Pat. Off. . |
| 60-191406 | 9/1985 | Japan . |
| 61-120318 | 6/1986 | Japan . |
| 61-222012 | 10/1986 | Japan . |
| 62-145527 | 6/1987 | Japan . |
| 63-103412 | 5/1988 | Japan . |
| 291807 | 3/1990 | Japan . |

*Primary Examiner*—Stuart S. Levy
*Assistant Examiner*—Allen Cao

[57] ABSTRACT

In an integrated thin film magnetic head, a write pole or inductive head $I_h$ includes first and second magnetic cores magnetically coupled to form a magnetic circuit and a coil formed between the first and second magnetic cores. An MR element read pole or MR head $MR_h$ includes first and second yokes, an MR element and a bias conductor for applying a biasing magnetic field on the MR device, and the first magnetic core or the second magnetic core constitutes the second yoke.

1 Claim, 8 Drawing Sheets

INTEGRATED THIN FILM MAGNETIC HEAD

This is a continuation of application Ser. No. 7/888,357, filed on May 27, 1992, which was abandoned upon the filing hereof.

FIELD OF THE INVENTION AND RELATED ART STATEMENT

1. Field of the Invention

The present invention relates to an integrated thin film magnetic head used in a magnetic writing and reading apparatus.

2. Description of the Prior Art

With the development of magnetic writing/reading capable of reading and writing with high recording density, the demand for a thin film magnetic head usable with a narrow track width and a multiple track system has been growing at a remarkable pace. Of known thin film magnetic heads, there are generally two types: one is an inductive head which uses a coil similar to that used in a bulk head, and the other is a read-only magneto-resistive head (MR head) which utilizes a magneto-resistive effect (MR effect).

Since the output level of the inductive head using the coil is proportional to the relative velocity of the recording medium against the magnetic head, it is low in the case of a small relative velocity. Therefore, it cannot read the magnetically recorded information unless relative velocity is sufficiently large. On the other hand, the MR head utilizing the MR effect has an advantage in that it can produce a signal having a constant output level irrespective of the relative velocity of the recording medium to the head because it can perform a magneto-electric conversion which is made by varying the resistance value of a magneto-resistive effect element (MR element) in response to the magnetic flux entering into the device from the recording medium. However, since the magneto-resistive conversion is one-way, the MR head cannot write information onto the recording medium; thus a magnetic writing/reading apparatus provided with an MR head requires a separate recording head. Therefore, in order to perform both recording and reading with an unitary head, it is necessary to laminate a recording (write) pole and a read pole on a single substrate.

Hereinafter, an elucidation will be made on an example of the conventional integrated thin film magnetic recording head comprising a write pole and a read pole formed on a single tip, First, the inductive head which serves as the write pole is formed such that on a magnetic substrate which serves as a first magnetic core layer, a coil is formed with a first insulator layer interposed inbetween. Then a second magnetic core layer is formed thereon with a second insulator layer interposed inbetween. At a front gap of the inductive head, its gap length or distance in the gap is determined by thickness of the second insulator layer. At a back gap, the second magnetic core is magnetically coupled to the magnetic substrate.

On top of the thus-deposited inductive head or write pole, an isolation layer composed of non-magnetic substance is deposited. Then, prior to the formation of the overlying MR head on the isolation layer, the surface of the isolation layer must be smoothed by lapping, because unevenness of the underlying inductive head is replicated as it is on the surface.

The conventional MR head comprises a lower yoke formed on the isolation layer, and thereon a third insulator layer, a bias conductor and a fourth insulator layer are laminated in that order. In order to supply a sense current on the MR element, two lead conductors formed by a layer are formed on both ends of the MR device. An upper yoke for applying a signal magnetic field of the recording medium is formed on the device with a fifth insulator interposed therebetween. At a front gap of MR head, its gap length is determined by the fifth insulator layer. At a back gap, the lower yoke is magnetically coupled with the upper yoke.

With any of the conventional integrated thin film magnetic heads, it has been difficult to reproduce the recorded information with satisfactory frequency characteristics because the write pole is completely isolated and independent from the read pole. In other words, in the case where the wavelength of the recorded information is in an integral multiple of the thickness of the isolation layer, the magnetic flux of the recording medium does not effectively enter into the reading pole due to a possible interaction with the magnetic core of the write pole. Therefore, the conventional integrated thin film magnetic head has a disadvantage in that the output level is low for a signal component having a wavelength which is an integral multiple of the thickness of the isolation layer.

In addition to this problem the conventional integrated thin film magnetic head has other disadvantages in that it needs an etching process to expose the coil layer for producing coil terminals, in that the etching process takes a long time when the isolation layer has a large thickness, and in that the making of the isolation layer takes a considerable time which leads to a high cost.

OBJECT AND SUMMARY OF THE INVENTION

The present invention intends to overcome the above-mentioned disadvantages inherent to the conventional ones, and has as its object the provision of an integrated thin film magnetic head having an excellent frequency characteristics.

According to the present invention, in the integrated thin film magnetic head at least one thin film write pole is provided with at least one thin film read pole deposited on a single substrate in a laminated relationship, wherein said thin film write pole comprises;

a first and a second magnetic cores which are magnetically coupled to form a magnetic circuit, and an electrically-conductive coil formed between the first and second magnetic cores; and the thin film read pole comprises;

a first yoke having a gap therein, a second yoke, a magneto-resistive effect element disposed at an adjacent location to the gap, and a bias conductor disposed at an adjacent location to the MR element for applying a biasing magnetic field on the MR element;

the first magnetic core or the second magnetic core of the thin film write pole also constituting the second yoke of the thin film read pole.

In the above-mentioned integrated thin film magnetic head, the substrate may preferably be a magnetic substrate which serves as the first magnetic core.

Alternatively, the substrate may be a non-magnetic substrate and the first magnetic core may be laminated on the non-magnetic substrate.

In case of the non-magnetic substrate, the second yoke in lieu of the first magnetic core may be laminated on the non-magnetic substrate.

Further, the thin film write pole and said thin film read pole may be laminated on the magnetic or non-magnetic substrate in regular sequence.

Alternatively, the thin film read pole and the thin film write pole may be laminated on the magnetic or non-magnetic substrate in regular sequence.

When configured as mentioned above, in the integrated thin film magnetic head built in accordance with the present invention, the upper magnetic layer of the write pole also works as the lower magnetic layer of the read pole, and thus the need for an isolation layer is eliminated. This magnetic head has an advantage in that it can reproduce the recorded information with improved frequency characteristics because it is free from the drop in the output level at a specified frequency range attributable to the existence of the isolation layer. In addition to this, the integrated thin film magnetic head of the present invention has another advantage in that it can reduce the overall thickness of the thin films and thus reduce the amount of uneven wear of the thin film layer.

Further, the integrated thin film magnetic head of the present invention has a further advantage in that it can easily expose the terminals such as coil terminals formed on the lower layer, bias terminals for the read pole and lead terminals, etc., because the thickness of the underlayer for flattening can be reduced as compared with conventional devices including an isolation layer disposed between the inductive head part and the overriding MR head.

While the novel features of the invention are set fourth particularly in the appended claims, the invention, both as to organization and content, will be better understood and appreciated, along with other objects and features thereof, from the following detailed description taken in conjunction with the drawings.

DESCRIPTION OF THE PREFERRED EMBODIMENTS

Figure 1:
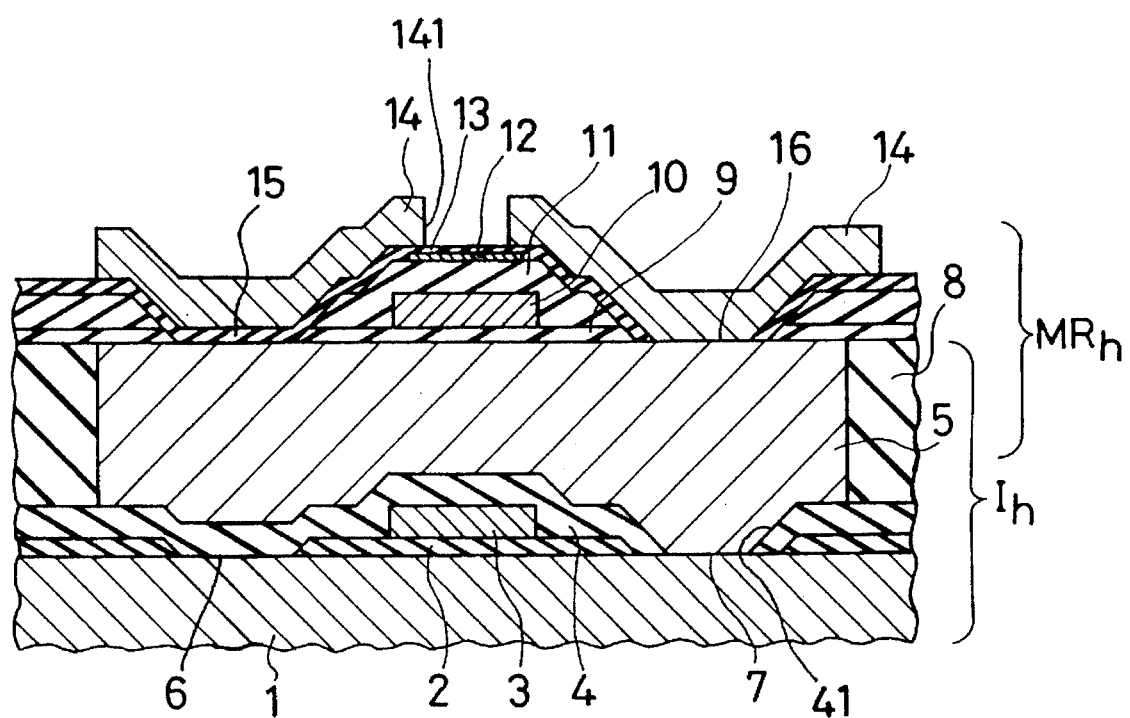
FIG. 1 and FIG. 1a are side cross-sectional views of the integrated thin film magnetic head of a first embodiment built in accordance with the present invention during its manufacturing process.
Figure 1A:
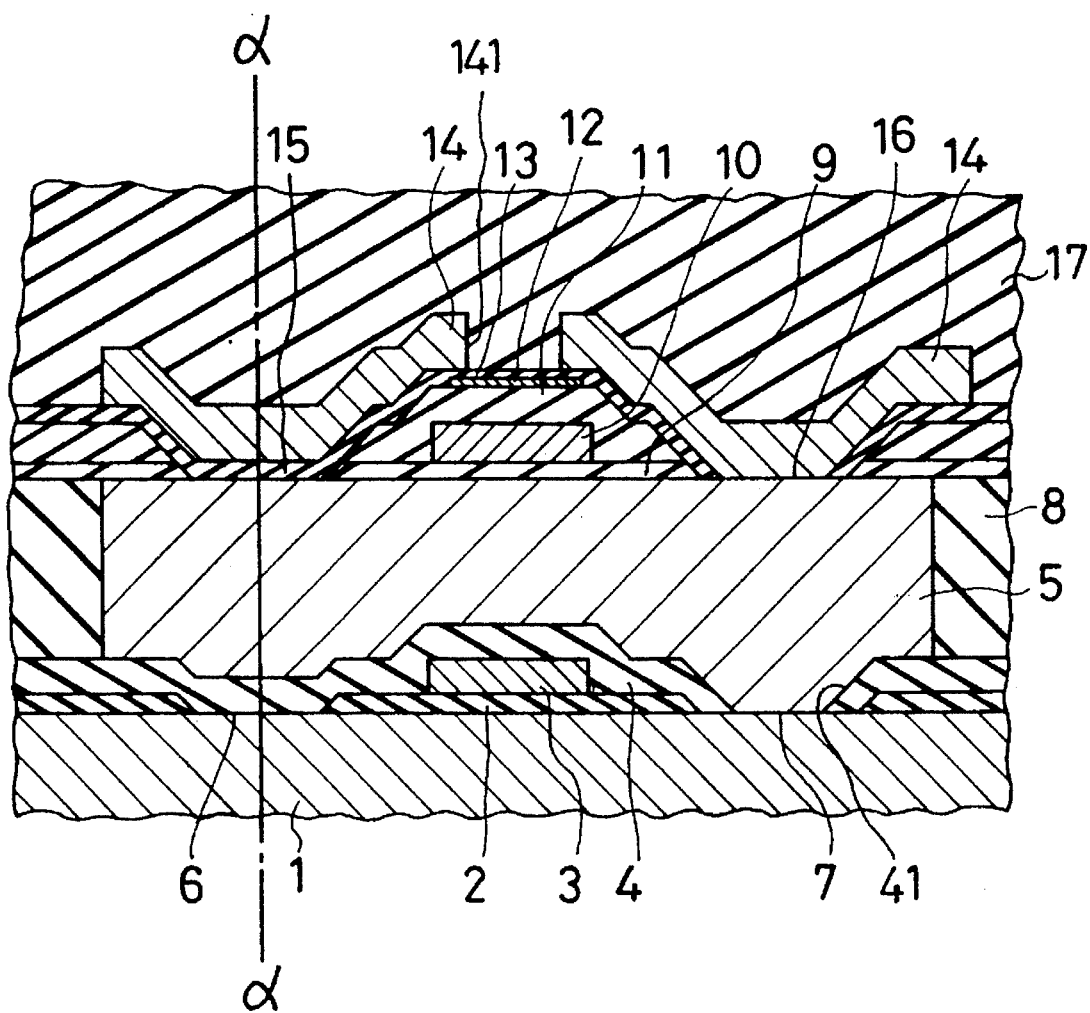

Example 1.

In the following several paragraphs, a first embodiment of the present invention will be elucidated with reference to FIGS. 1, 1a, 1b and 1c of the drawings.

[Configuration]

A write pole, which is the inductive head, is configured as follows:

At first, on a magnetic substrate 1 of a ferrite, a first insulator layer 2 of $SiO_2$ is formed by a known lithographic method so as to have a predetermined pattern which is designed for making an inductive head or writing head. The thickness of the first insulator layer 2 is preferably from 0.5 µm to 1.0 µm. Thereafter, a coil layer 3 of 1.0 µm gold is formed on a selected part of the first insulator 2 by a known vapor deposition method using a lithographic method. Then, on the substrate having the first insulator layer 2 and the coil layer 8, a second insulator layer 4 of 1.0 µm thickness is formed with a predetermined pattern having an opening 41 by a known lithographic method.

Thereafter, a second magnetic core layer 5 of 6 µm thickness Co-based amorphous composition patterned to have a given shape, which determines the write track width by its shape, is formed. In order to obtain a very even and flat surface necessary for subsequent forming of an overriding structure of an MR head, the underlayer for flattening 8 is formed on the second insulator layer 4, in a manner to fill the regions not covered by the second magnetic core layer 5. The filler layer 8 is made of alumina ($Al_2O_3$) and has a thickness equal to or slightly larger than that of the second magnetic core layer 5. After the forming of the filler layer 8, the surfaces of the second magnetic core layer 5 and the filler layer 8 are smoothed by lapping to produce a continuous even flat surface.

The above-mentioned configuration forms the writing head which is an inductive type head. In the inductive head, the gap length at the front gap part 6 is determined by the thickness of the second insulator layer 4. At the back gap part 7, the second magnetic layer 5 is magnetically coupled to the magnetic substrate 1. On the above-mentioned inductive head part $I_h$, the below-mentioned MR head part $MR_h$ is configured.

The MR head part $MR_h$, or the read pole, is configured as follow. At first, a third insulator layer ($SiO_2$) 9 is deposited on the second magnetic core 5, and then a bias conductor 10 of gold is deposited on the insulator layer 9. Thereafter, a fourth insulator layer 11 of $SiO_2$ is formed further thereon. Then an MR element 12 of permalloy layer is formed thereon. A pair of lead wires (not shown in FIG. 1 of gold are connected to both end of the MR element 12 in order to flow a sense current through the MR element 12. Thereafter, a fifth insulator layer 13 of $SiO_2$ is formed. Then, a yoke 14 of Co-based amorphous material which is for applying the signal magnetic field derived from the recorded information on the recording medium, is laminated on the MR element 12. The yoke 14 determines the read track width by its shape. At the front gap 15 of the reading pole, the gap length is determined by thickness of the fifth insulator layer 13. At the back gap 16 the yoke 14 makes direct contact and is magnetically coupled with the second magnetic core 5.

Figure 1B:
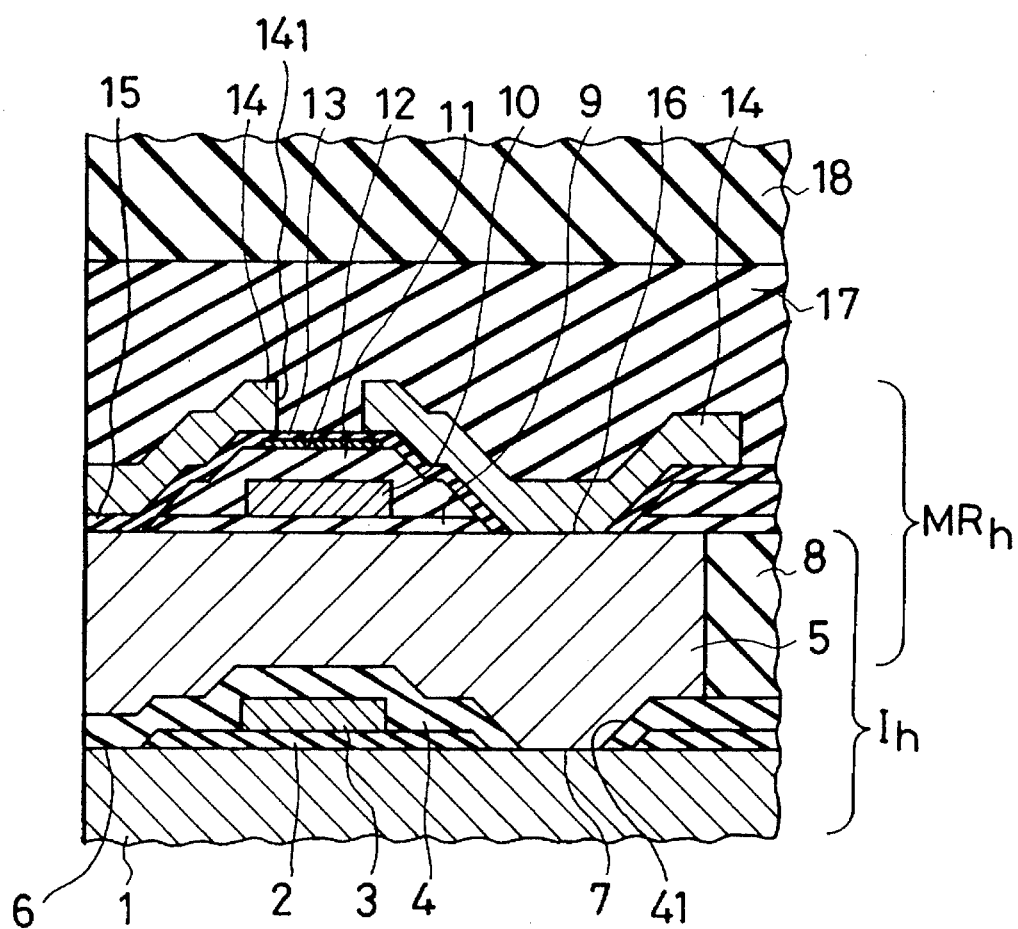
FIG. 1b is a side cross-sectional view of the integrated thin film magnetic head shown in FIG. 1a in its completed form.
Figure 1C:
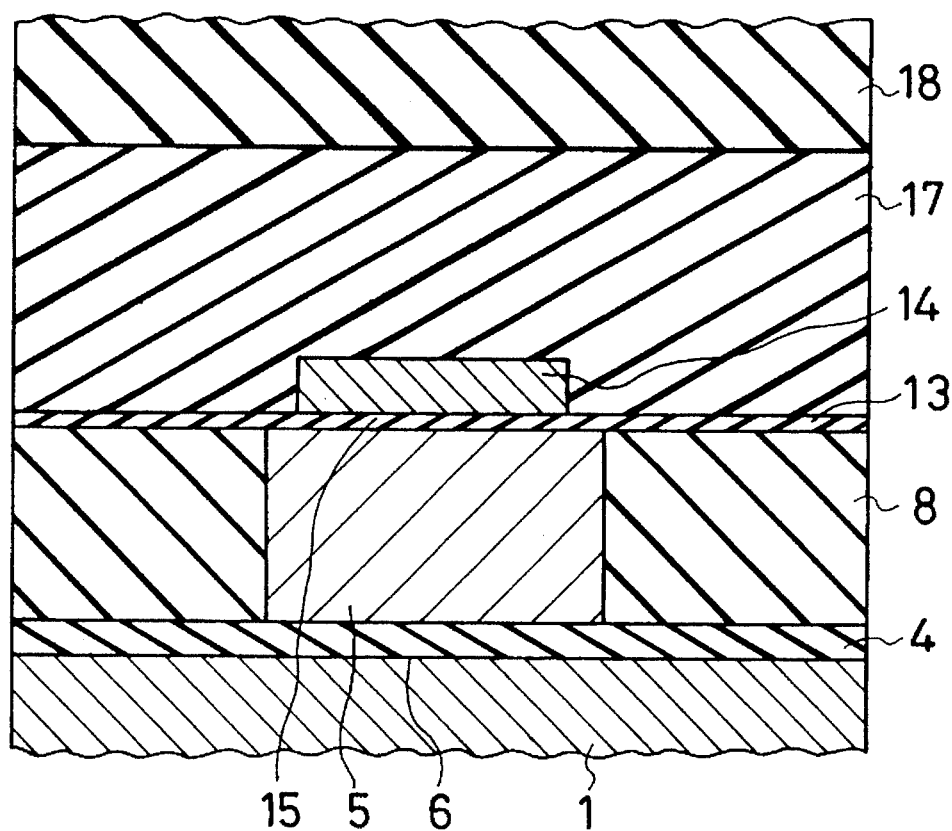
FIG. 1c is a front view of the integrated thin film magnetic head shown in FIG. 1b.

After the deposition of the yoke 14, a protective layer 17 of alumina ($Al_2O_3$) is deposited as shown in FIG. 1b. Since the unevenness of the yoke 14 is replicated on the surface of the protective layer 17 as it is, the surface of protective layer 17 is smoothed by lapping. Further, a protective substrate 18 of alumina is bonded thereon. Then, the resultant laminated body is cut along a slightly convex sliding face (this sliding face is formed as a slightly convex cylindrical face of very small curvature in order to give a tape a good contact to the head), as shown by a line α—α including the front gaps 6 and 15 to expose a sliding surface shown by the front view of the head of FIG. 1c. The sliding surface is thereafter finished to have a given shape and surface condition convenient for contacting the recording medium.

[Operation]

Hereinafter, the operation of the above-mentioned integrated thin film magnetic head will be described. During recording, when a write current flows in the coil 3, a signal magnetic flux is induced by the current and thereby flows a signal magnetic flux through a magnetic circuit composed of the magnetic substrate 1 (serving as the first magnetic core) and the second magnetic core 5, and produces, a signal magnetic field at the front gap 6 of the write pole, whereby information is stored on a recording medium.

During playback, a D.C. current flows through the bias conductor 10 for applying a biasing magnetic field to the MR element 12, and a signal magnetic field produced in response to the recorded information on the recording medium enters through the front gap 15 of the read pole. The signal magnetic flux flows through a magnetic circuit composed of the second magnetic core 5 and the yokes 14 having the MR element 12 at their gap 141. At that time, the resistance value of the MR element varies in response to the signal magnetic field applied to the MR element, and this variation in the resistance value is taken out as a voltage signal from the lead conductors.

In this Example 1, since the second magnetic core 5 of the write pole or the inductive head also serves as the second yoke of the reading pole or the MR head, the need for isolation layer is eliminated, thereby decreasing total thickness, and the recorded information is reproduced with improved frequency characteristics. In addition to this, since the overall layer thickness of the thin films is reduced, the amount of the uneven wear of the thin films can also be reduced.

Further, in manufacturing the exemplified head, it is easy to expose the coil 3 to form the coil terminals by etching the underlayer for flattening 8, because the thickness of the underlayer for flattening 8 is the same as that of the second magnetic layer 5. Thus, the etching itself is performed easily.

In this Working Example, although substrate made of a magnetic substance is used, it is needless to mention that the same advantage will be obtained by using a non-magnetic substrate having the first magnetic core laminated thereon and configuring the integrated thin film magnetic head based on this first magnetic core in a similar configuration.

Example 2.

In the following paragraphs, the second embodiment of the present invention will be elucidated with reference to FIGS. 2, 2a, 2b and 2c of the drawings.

In this example, the order of the inductive head part $I_h$ and the MR head part $MR_h$ are different from those of the Example 1, but the natures and thicknesses thereof are substantially the same as those of Example 1.

[Configuration]

Figure 2:
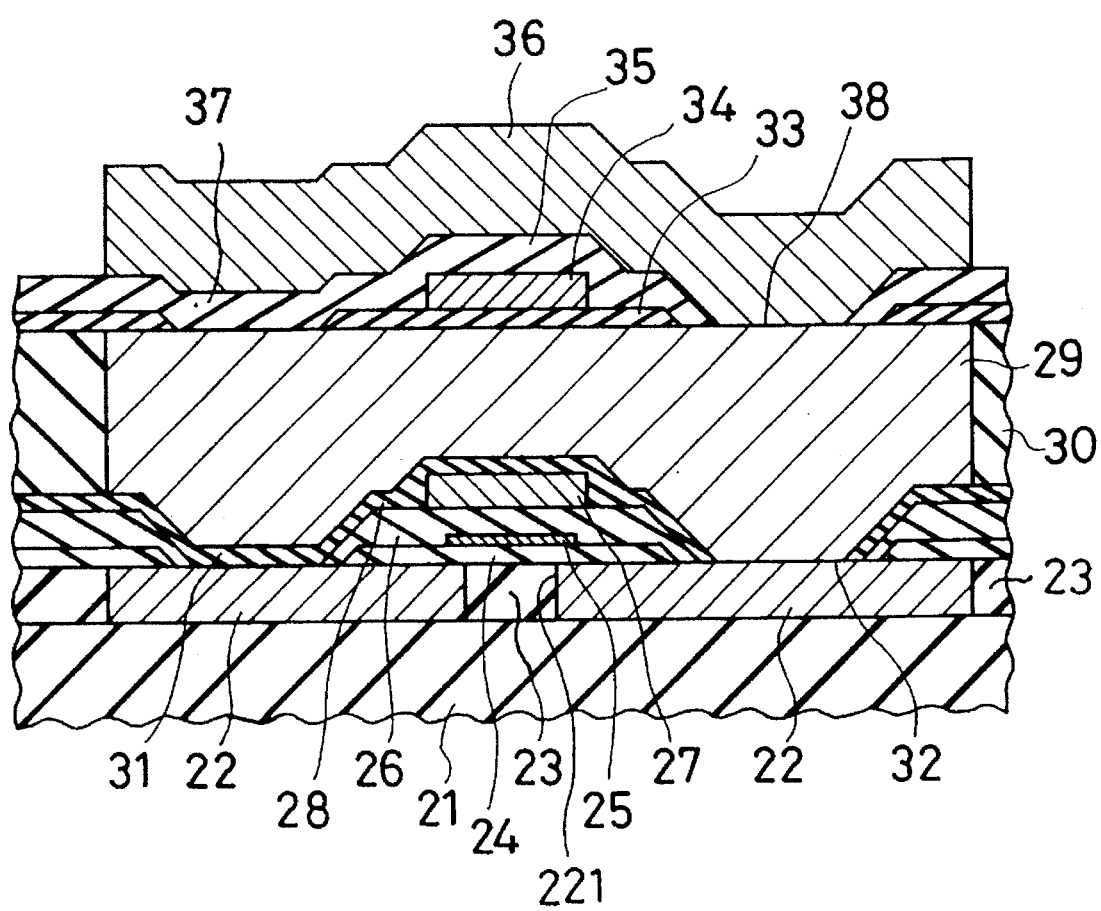
FIG. 2 and FIG. 2a are side cross-sectional views of the integrated thin film magnetic head of a second embodiment built in accordance with the present invention during its manufacturing process.
Figure 2A:
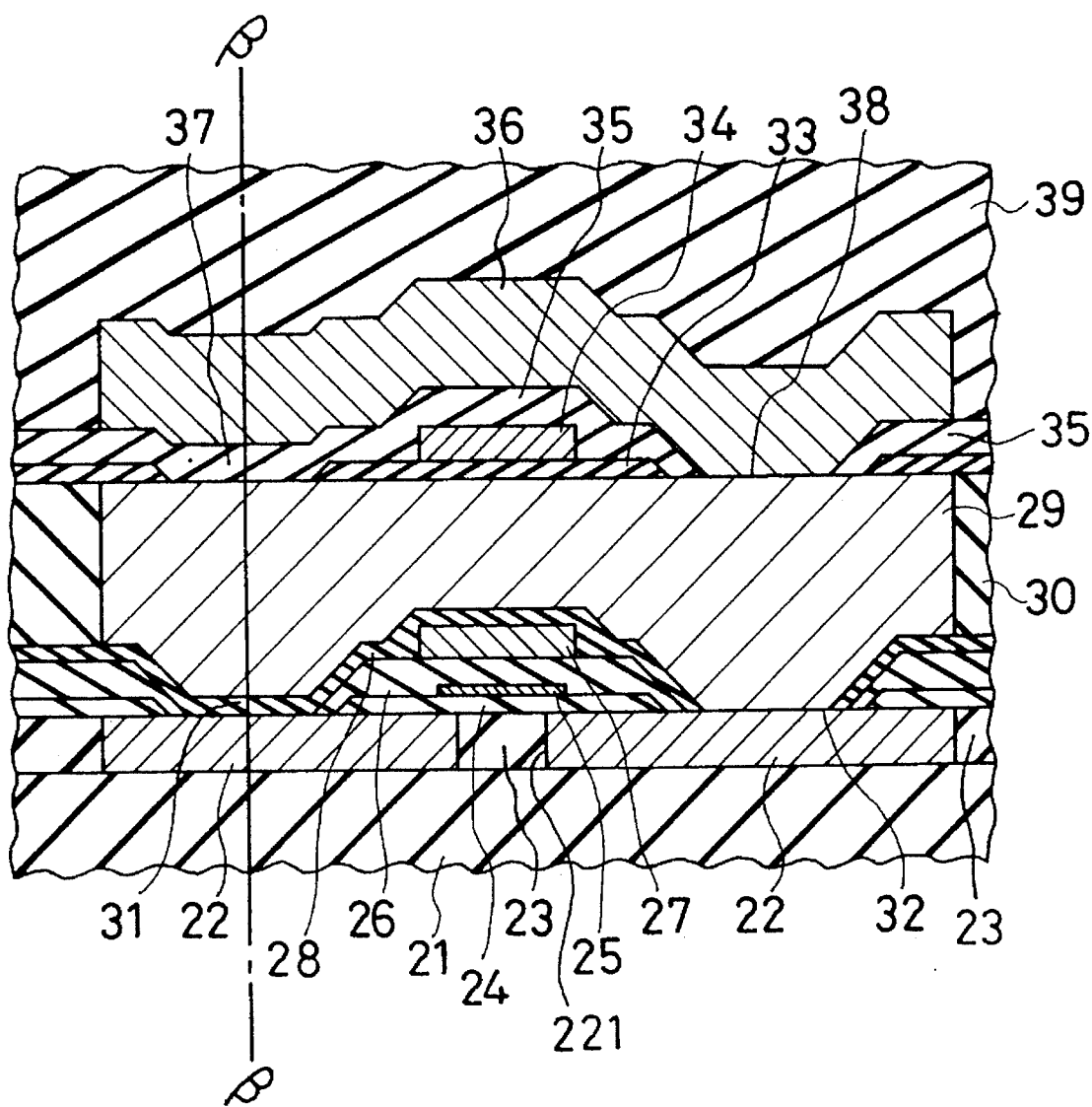

The MR head, which is the read pole, is configured as follows:

At first, as shown in FIG. 2 a layer 22 of a first yoke of Co-based amorphous material having openings is deposited on a non-magnetic substrate 21. After filling a first insulator layer of silicon dioxide ($SiO_2$) 23 in the openings in the first yoke 22 for obtaining a flat face theretogether, a second insulator layer ($SiO_2$) 24 of a selected pattern is formed thereon, and further thereon a MR element 25 made of a permalloy layer is formed. A pair of lead conductors of a gold layer (not shown in the drawing) are provided by a known method to both ends of the MR element 25 to flow a sense current therethrough. Then a third insulator layer ($SiO_2$) 26 is formed thereon, and a bias conductor 27 of gold is formed further thereon. Thereafter, a fourth insulator layer 28 of $SiO_2$ is formed to cover the bias conductor 27. Further, a first magnetic core layer 29 of Co-based amorphous material is formed. This first magnetic core layer 29 also serves as a second yoke.

The yoke 22 is patterned to have a given shape for determining the read track width by its shape; however, unevenness of the read pole is replicated on the surface of the first magnetic core layer 29 as it was when formed. In order to obtain a very even and flat surface necessary for subsequent forming of an overriding structure of the inductive head, a filler layer 30 is formed on the first yoke 22 and the second insulator layer 28 in a manner to fill the regions not covered by the first magnetic core layer 29. The filler layer 30 is made of alumina ($Al_2O_3$) and has a thickness equal to or slightly larger than that of the first magnetic core layer 29. After the filler layer 30 is formed, the surfaces of the first magnetic core layer 29 and the underlayer for flattening 30 are smoothed by lapping to produce a continuous even flat surface. At the front gap 31 of the read pole, its gap length is determined by the thickness of the fourth insulator layer 28, and at the back gap 32, the first magnetic core 29 is magnetically coupled to the first yoke layer 22.

A write pole, which is the inductive head, is configured as follows:

First, a fifth insulator layer 33 of $SiO_2$ is formed on the first magnetic core 29 and on the filler layer 30. Then, the fifth insulator layer 33 is etched to form a front gap 37 and a back gap 38. At the front gap 37, the gap length is determined by a sixth insulator layer 35 of $SiO_2$, and at the back gap 38 the first magnetic core 29 is magnetically coupled to the second magnetic core 36. On the fifth insulator layer 33, a sixth insulator layer 35 is formed, and further thereon a coil 34 of gold and the second magnetic core layer 36 is piled up. The second magnetic core 36 is patterned to have a given shape in order to control the write track width by the shape.

Figure 2B:
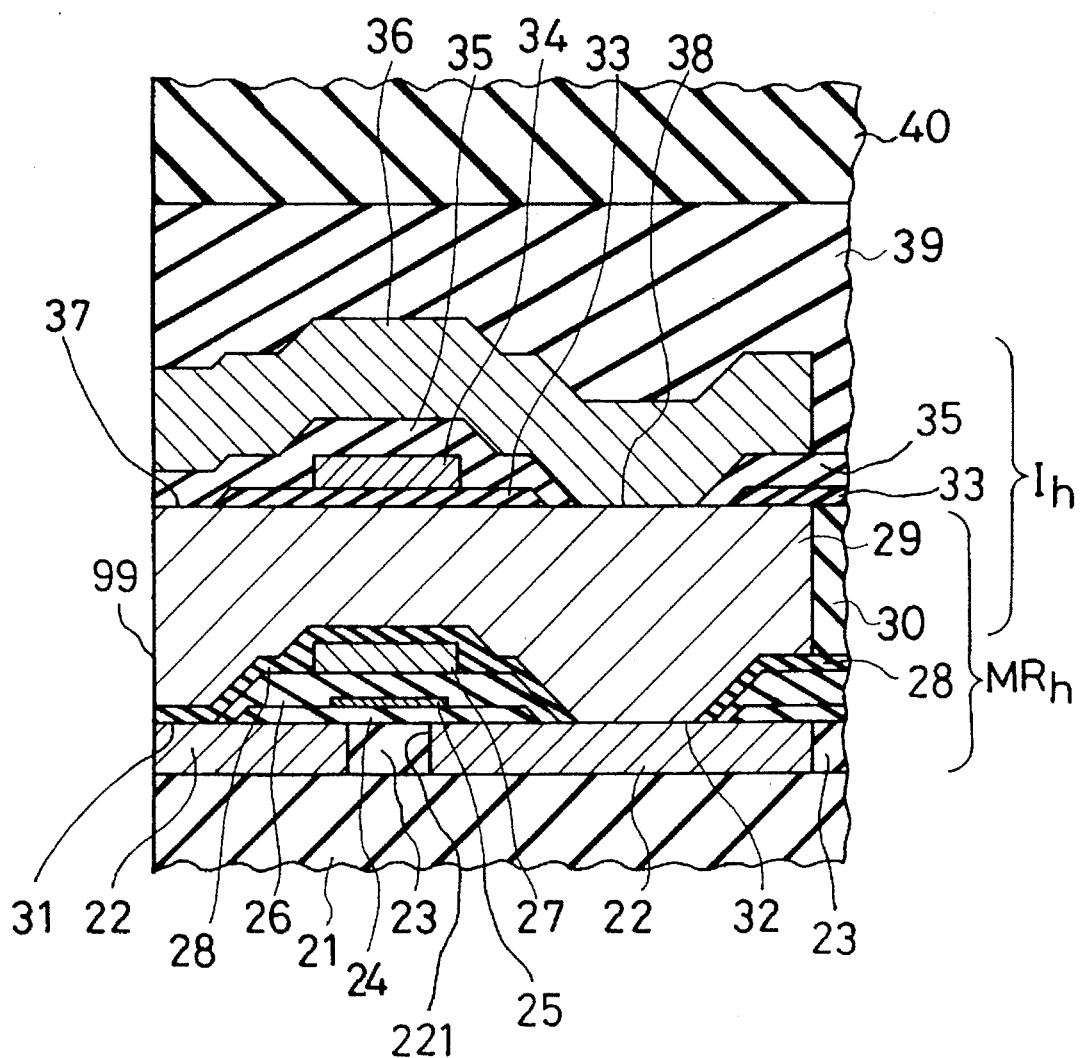
FIG. 2b is a side cross-sectional view of the integrated thin film magnetic head shown in FIG. 2a in its completed form.
Figure 2C:
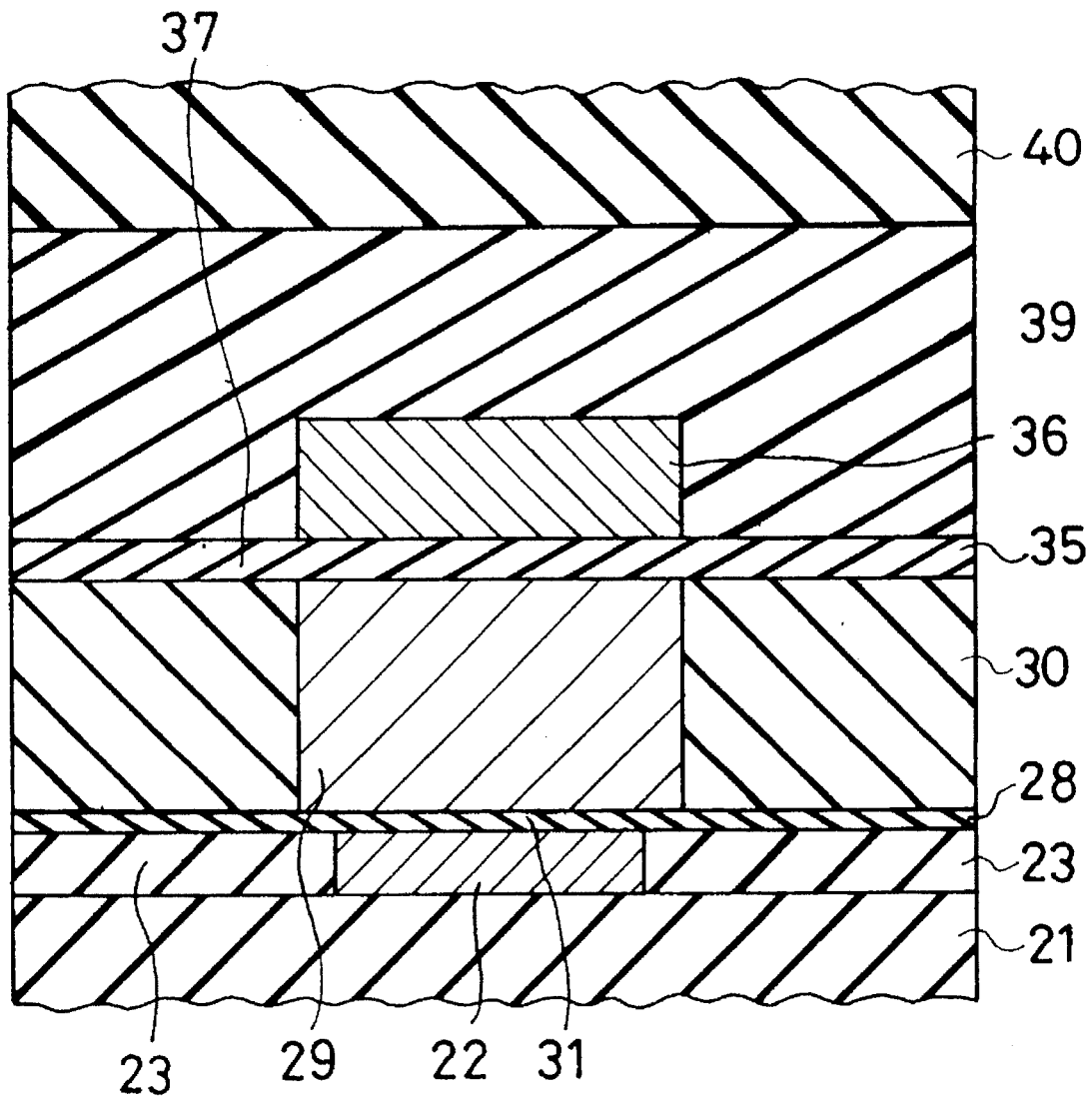
FIG. 2c is a front view of the integrated thin film magnetic head shown in FIG. 2b.

After the deposition of the second magnetic core 36, a protective layer 39 of alumina $Al_2O_3$ is deposited as shown in FIG. 2b. Since the unevenness of the second magnetic core 36 is replicated on the surface of the protective layer 39 as it is, the surface is smoothed by lapping. Further, a protective substrate 40 of alumina is bonded to the smoothly lapped surface. Then, the resultant laminated body is cut along a slightly convex sliding face shown by a line β—β including the front gaps 31 and 37 to expose a sliding surface as shown by the front view of the head of FIG. 2c. The sliding surface is thereafter finished in a manner to have given shape convenient for contacting the recording medium.

[Operation]

Hereinafter, the operation of the above-mentioned integrated thin film magnetic head will be described. During recording, when a write signal current flows in the coil 34, a signal magnetic flux induced by the current flows through a magnetic circuit composed of the first magnetic core 29 and the second magnetic core 36 and makes a magnetic field at the front gap 37 of the write pole. Thereby, information is stored on a recording medium which slides by the tape running face 99.

During playback, a D.C. current flows through the bias conductor 27 for applying a biasing magnetic field to the MR element 25. Then, a signal magnetic field is produced in response to the recorded information on the recording medium, and a magnetic flux flows from the front gap 31 of the read pole through a magnetic circuit composed of the yoke 22 and the first magnetic core 29. Therefore, a signal magnetic field is induced at the gap 221 and this magnetic field is applied to the MR device. Accordingly, the resistance value of the MR device 25 varies in response to the signal magnetic field, and this variation in the resistance value induces a variance in the voltage to be sensed.

In this Working Example, since the first magnetic core 29 of the write pole or the inductive head also serves as the second yoke of the read pole or the MR head, the isolation layer is dispensed with, thereby decreasing the total thickness and further the recorded information is reproduced with improved frequency characteristics. In addition to this, since the overall layer thickness of the thin films is reduced, the amount of the uneven wear of the thin films can also be reduced.

Further, in manufacturing the exemplified head, it is easy to expose the bias conductor 27 and the lead terminal (not shown in the drawing) to form the bias terminals by etching the underlayer for flattening 30, because the thickness of the underlayer for flattening 30 is the same as that of the second magnetic layer 29. Thus the etching itself is performed easily.

Although the invention has been described in terms of the presently preferred embodiments, it is to be understood that such disclosure is not to be interpreted as limiting. Various alterations and modifications will no doubt become apparent to those skilled in the art having read the above disclosure. Accordingly, it is intended that the appended claims be interpreted as covering all alterations and modifications as fall within the true spirit and scope of the invention.

What is claimed is:

1. An integrated thin film magnetic head comprising:

a non-magnetic substrate;

a thin film read pole laminated in a surface-to-surface abutting relation on said non-magnetic substrate; and a thin film write pole laminated on said thin film read pole opposite said non-magnetic substrate, said thin film read pole overlying said non-magnetic substrate, which is formed prior to said thin film read pole, and said thin film read pole underlying said thin film write pole, which is formed after said thin film read pole, said thin film read pole comprising:
   a first yoke laminated on said non-magnetic substrate in an abutting relation therewith such that said first yoke overlies said non-magnetic substrate, said first yoke having a gap defined therein,
   a magneto-resistive effect element overlying said first yoke at a location adjacent to said gap,
   a second yoke overlying said magneto-resistive effect element, said first yoke, said second yoke and said magneto-resistive effect element being magnetically coupled to form a first magnetic circuit,
   a bias conductor overlying said magneto-resistive effect element at a location adjacent to said magneto-resistive effect element and underlying said second yoke, said bias conductor being operative to apply a biasing magnetic field on said magneto-resistive effect element, and
   a first front gap member disposed between said first yoke and said second yoke, said first front gap member being disposed to face said recording medium during operation of said thin film magnetic head;

said thin film write pole comprising:
   a first magnetic core,
   a second magnetic core being magnetically coupled to said first magnetic core to form a second magnetic circuit,
   an electrically-conductive coil disposed between said first magnetic core and said second magnetic core, and
   a second front gap member disposed between said first magnetic core and said second magnetic core, said second front gap member being disposed to face a recording medium during operation of said thin film magnetic head;

said first yoke being first laminated on said non-magnetic substrate, said magneto-restrictive effect element being next laminated on said first yoke, said bias conductor being next laminated over said magneto-restrictive effect element, said second yoke being next laminated over said bias conductor, said electrically conductive coil being next laminated over said second yoke, and said second magnetic core being next laminated over said electrically conductive coil, said non-magnetic substrate having a thickness and said magneto-resistive effect element being provided proximate to said non-magnetic substrate to minimize stresses induced in said magneto-resistive effect element during manufacture of said integrated thin film magnetic head, and said first magnetic core of said thin film write pole also constituting said second yoke of said thin film read pole, so that said first magnetic core and said second magnetic core of said thin film write pole and said first yoke and said second yoke of said thin film read pole are magnetically coupled with each other, thereby minimizing a thickness of said integrated thin film magnetic head.

\* \* \* \* \*

UNITED STATES PATENT AND TRADEMARK OFFICE
CERTIFICATE OF CORRECTION

PATENT NO.       : 5,535,079
DATED            : July 9, 1996
INVENTOR(S)      : FUKAZAWA et al.

It is certified that error appears in the above-identified patent and that said Letters Patent is hereby corrected as shown below:

On the title page,
Please add Item --[73] Assignee: Matsushita Electric Industrial Co., Ltd., Osaka-FU, Japan--.

Signed and Sealed this

Second Day of September, 1997

Attest:

BRUCE LEHMAN

Attesting Officer

Commissioner of Patents and Trademarks